(12) United States Patent
Sharma et al.

(10) Patent No.: US 9,578,044 B1
(45) Date of Patent: Feb. 21, 2017

(54) DETECTION OF ANOMALOUS ADVERTISING CONTENT

(71) Applicant: Amazon Technologies, Inc., Reno, NV (US)

(72) Inventors: Keerat Singh Sharma, Lynnwood, WA (US); James Rupert William Phillips, New Castle, WA (US); Ankit Rajiv Kuwadekar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 270 days.

(21) Appl. No.: 14/223,544

(22) Filed: Mar. 24, 2014

(51) Int. Cl.
G06F 12/14 (2006.01)
H04L 29/06 (2006.01)

(52) U.S. Cl.
CPC ................. H04L 63/1416 (2013.01)

(58) Field of Classification Search
CPC ............ H04L 63/1416; G06F 3/0481
USPC .................. 713/188; 709/224, 225; 715/788
See application file for complete search history.

(56) References Cited

U.S. PATENT DOCUMENTS

| 7,630,986 | B1 * | 12/2009 | Herz | G06Q 10/10 |
| 7,822,620 | B2 * | 10/2010 | Dixon | G06Q 30/02 705/1.1 |
| 8,661,111 | B1 * | 2/2014 | Lauckhart | 709/224 |
| 9,009,834 | B1 * | 4/2015 | Ren | G06F 21/10 709/224 |
| 9,027,140 | B1 * | 5/2015 | Watkins | 709/219 |
| 2005/0235030 | A1 * | 10/2005 | Lauckhart | G06F 17/30864 709/200 |
| 2006/0253584 | A1 * | 11/2006 | Dixon | G06Q 30/02 709/225 |
| 2009/0106840 | A1 * | 4/2009 | Dreymann | G06F 21/56 726/23 |
| 2009/0112685 | A1 * | 4/2009 | Tunguz-Zawislak | G06Q 30/02 705/14.72 |
| 2009/0282485 | A1 * | 11/2009 | Bennett | G06F 21/51 726/24 |
| 2010/0057843 | A1 * | 3/2010 | Landsman | H04L 63/0407 709/203 |
| 2010/0287580 | A1 * | 11/2010 | Harding | G06Q 30/0247 725/14 |
| 2010/0306249 | A1 * | 12/2010 | Hill | G06F 17/30867 707/769 |
| 2011/0125587 | A1 * | 5/2011 | Netzer | G06Q 30/02 705/14.68 |
| 2011/0126286 | A1 * | 5/2011 | Nazarov | G06F 21/564 726/24 |
| 2011/0173126 | A1 * | 7/2011 | Knapp | G06Q 20/3829 705/71 |
| 2013/0160120 | A1 * | 6/2013 | Malaviya | G06F 21/53 726/23 |
| 2013/0268357 | A1 * | 10/2013 | Heath | H04L 63/00 705/14.53 |

(Continued)

Primary Examiner — Thu Ha Nguyen
(74) Attorney, Agent, or Firm — Sutherland Asbill & Brennan LLP

(57) ABSTRACT

Systems, methods, and computer-readable media are disclosed for detecting anomalous advertising content and taking or directing one or more actions to be taken to mitigate risk associated with anomalous advertising content. The anomalous advertising content indicates a deviation from an expected state of the advertising content. Various measures may be taken to determine whether the anomalous advertising content is reflective of malware.

22 Claims, 7 Drawing Sheets

(56) References Cited

U.S. PATENT DOCUMENTS

| | | | |
|---|---|---|---|
| 2014/0180835 A1* | 6/2014 | Bitran | G06Q 30/0241 |
| | | | 705/14.73 |
| 2014/0201678 A1* | 7/2014 | Shen | G06F 3/0481 |
| | | | 715/788 |
| 2015/0095166 A1* | 4/2015 | Sweeney | G06Q 30/08 |
| | | | 705/14.71 |
| 2015/0281258 A1* | 10/2015 | Watkins | G06Q 30/0277 |
| | | | 726/23 |
| 2016/0171248 A1* | 6/2016 | Nesher | G06F 21/53 |
| | | | 713/190 |

* cited by examiner

DETECTION OF ANOMALOUS ADVERTISING CONTENT

BACKGROUND

Online advertising refers to the use of an online network such as the Internet to deliver promotional marketing messages to consumers. Online advertising may take on any of a variety of forms such as, for example, e-mail marketing, search engine marketing, social media marketing, various forms of display advertising (e.g., web banner advertising), mobile advertising, and so forth.

Malware (a shortened form for "malicious software") may include any software that disrupts the operation of a computing device, gathers sensitive information, or gains access to private computing systems. Malware may take on any suitable form including, for example, executable code, scripts, active content, or other software. Malware includes, for example, computer viruses, ransomware, worms, Trojan horses, rootkits, keyloggers, dialers, spyware, adware, malicious browser helper objects (BHOs), rogue security software, or other malicious software.

Malvertising (a shortened form for "malicious advertising") refers to the use of online advertising to spread malware. Malvertising may take on any of a variety of forms including, for example, pop-up advertisements for deceptive downloads (e.g., a fake anti-virus program that installs malicious software), drive-by downloads, web widgets that redirect to malicious sites, hidden iframes, malicious banner advertisements, and so forth. Malvertising may be particularly difficult to combat because infections delivered through malvertising may not require user action (e.g., a user click) to compromise a system and may not exploit identifiable vulnerabilities on a website or a server hosting the site.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
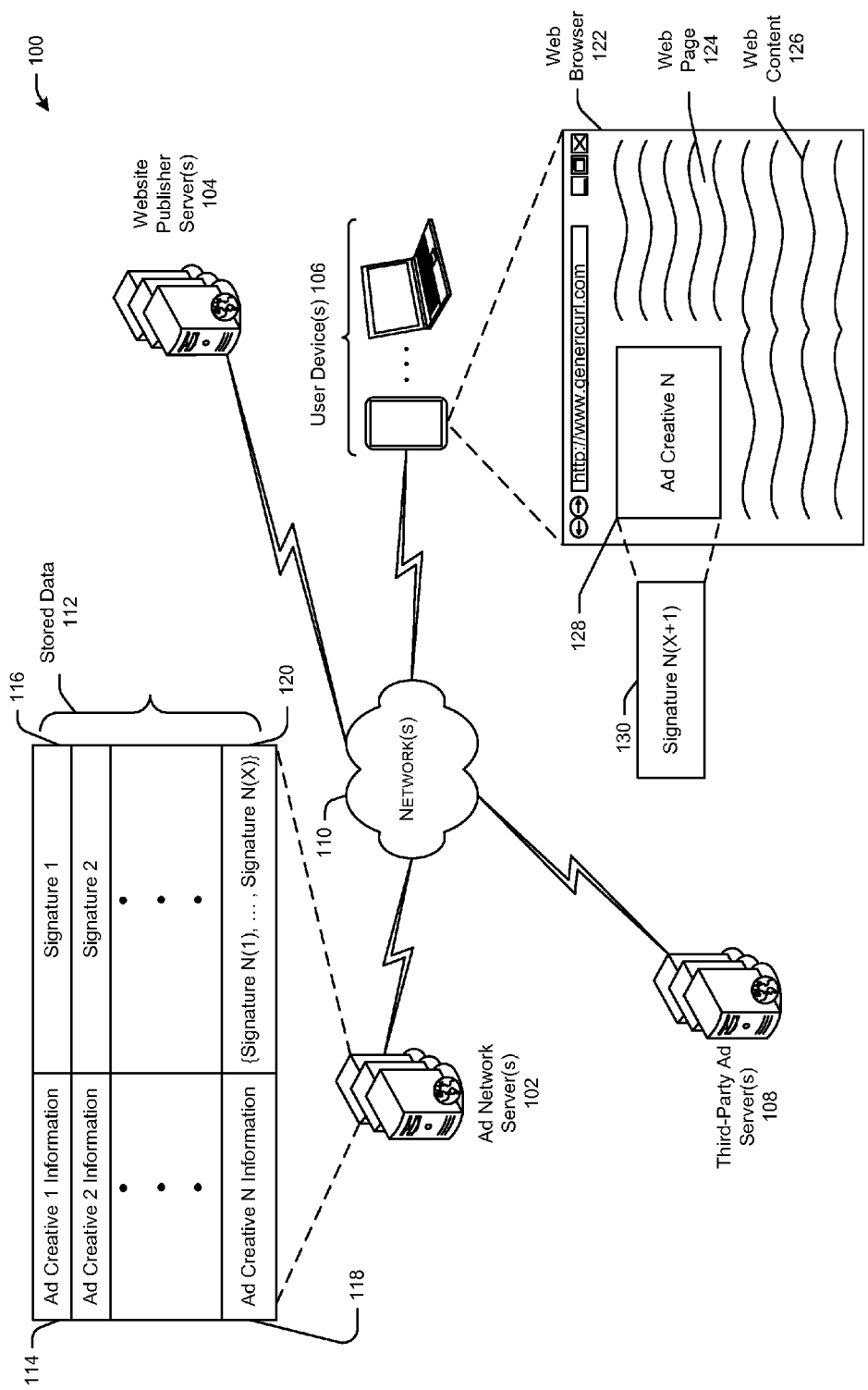
FIG. 1 is a schematic diagram depicting an illustrative networked architecture in which a potentially anomalous advertisement may be rendered on a user device in accordance with one or more example embodiments of the disclosure.

This disclosure relates to, among other things, systems, methods, computer-readable media, techniques, and methodologies for detecting anomalous advertisements and taking or directing one or more actions to be taken responsive to detection of anomalous advertisements. An advertisement may be determined to be anomalous if it deviates from an expected state. Such a deviation may be symptomatic of or caused by malware.

In an example scenario, a rogue advertiser may attempt to deliver malware in connection with online advertising. For example, an advertisement embedded, integrated, or otherwise associated with malware (at times referred to herein as a "malware advertisement," "malvertising," or the like) may be provided by a rogue advertiser to an ad network. The ad network may facilitate transmission of the malware advertisement for rendering in available advertising inventory on publisher websites. Malware associated with an advertisement may cause deleterious effects to occur (e.g., logging of keystrokes, theft of sensitive information, etc.) responsive to user interaction with the malware advertisement (e.g., a user click) or responsive, potentially, to rendering of the malware advertisement itself. In other example scenarios, malware be injected into or otherwise associated with a legitimate advertisement by a hacker or other rogue entity not associated with the advertiser. For example, an otherwise legitimate advertisement may be "hijacked" and transformed into a malware advertisement prior to receipt by the ad network or prior to being served in an available advertising slot. It should be appreciated that the term "ad network," as used herein, may include any combination of ad server(s) (potentially forming part of an ad exchange), server(s) forming part of a content delivery network (CDN), or any other suitable computing device that may play a role in the delivery of online advertising content.

In accordance with one or more example embodiments of the disclosure, an advertisement may be analyzed to determine whether it exhibits anomalous characteristics, in which case, it may be determined to be a potential malware advertisement, and one or more response actions may be taken. For example, various advertisements may be pre-registered with an ad network. Pre-registration may involve receipt of an ad creative and generation of a structural representation of the ad creative. The structural representation of the ad creative may then be traversed or otherwise evaluated to capture ad creative information relating to ad creative assets forming part of the ad creative and metadata associated with the ad creative assets. The ad creative information may then be provided as input to a cryptographic hash function or the like to generate a hash value that may serve as a unique signature of the ad creative. One or more both of the ad creative information gleaned from evaluation of the structural representation of the ad creative or the hash value may be stored in one or more datastores in association with the ad creative or an identifier that identifies the ad creative.

As an illustrative and non-limiting example, an ad network may generate or identify a document object model (DOM) associated with an ad creative. The DOM may have the structure of tree including a set of nodes where each node may be associated with an asset of the ad creative and corresponding metadata such as a domain storing the asset and from which the asset may be downloaded; size, content, placement, or other attributes of the asset; and so forth. The DOM tree may be traversed or otherwise evaluated to generate ad creative information indicative of the ad creative assets forming part of the ad creative and associated metadata.

In certain other example embodiments of the disclosure, ad creative information may not be obtained via pre-registration of the ad creative but may be acquired over time as impressions of the advertisement are served. For example, in those example scenarios in which an ad creative is associated with a set of targeting constraints, the ad network may accumulate respective ad creative information associated with each served impression of the advertisement. A cryptographic hash function may be applied to the received ad creative information to generate a set of signatures associated with the advertisement. As impressions of the advertisement continue to be served, the set of signatures may be expanded to include additional signatures reflective of the respective targeting attributes and other attributes associated with each served ad impression. The targeting constraints, attributes, or criteria may include, but are not limited to, geographic targeting criteria, user demographic or other user attribute targeting criteria, ad placement targeting criteria (e.g., an above-the-fold ad placement targeting constraint), contextual targeting criteria, and so forth.

In accordance with one or more example embodiments of the disclosure, client-side functionality may be provided to identify ad creative information indicative of the structure of an advertisement being served on a client device. Similar to the functionality supported by the ad network described above, the client-side functionality may be configured to generate a structural representation of an ad creative (e.g., a DOM tree) and traverse or otherwise evaluate the structural representation to determine ad creative information associated with the ad creative. The client-side functionality may evaluate the ad creative responsive to rendering of the advertisement such as, for example, after a certain period of time has elapsed since the ad creative began to load or responsive to one or more browser events associated with loading of the ad creative.

As previously noted, such ad creative information may include, for example, an identification of assets that form part of the ad creative as well as associated metadata. The client-side functionality may be further configured to generate a signature that uniquely identifies the rendered ad creative by, for example, executing a cryptographic hash function that receives the ad creative information as input and outputs a hash value associated with the ad creative. The client-side functionality may direct transmission of the ad creative information (e.g., a payload indicative of the ad creative rendered on the client device) or the generated signature to the ad network which may, in turn, compare the received ad creative information or signature to stored ad creative information or stored signatures to determine whether the ad creative rendered on the client device is exhibiting anomalous characteristics.

The client-side functionality may take on any of a variety of forms including, but not limited to, a validation program that the ad network embeds in the ad creative (e.g., a Javascript™ program), a web browser extension (e.g., a browser toolbar) that may operate in conjunction with a validation program provided by the ad network, a validation program integrated with or otherwise provided in association with web content hosted by a web server, functionality supported by a browser application provided by an entity that is the same or which is affiliated with an entity that operates the ad network, and so forth. It should be appreciated that a variety of alternatives for providing the client-side functionality are within the scope of this disclosure. For example, in certain example embodiments, a validation program (e.g., a Javascript™ program) embedded in an ad creative or otherwise provided by the ad network may take the form of a browser toolbar or the like.

As previously alluded to, upon receipt of ad creative information or a signature associated with a rendered ad creative, the ad network may compare the received ad creative information or signature against a database of stored ad creative information or stored signatures. In certain example embodiments, if a match is detected, the ad network may determine that the rendered ad creative is not exhibiting anomalous characteristics. On the other hand, in certain other example embodiments, if a match is not detected, the ad network may determine that the rendered ad creative is exhibiting anomalous characteristics and may proceed to take or direct one or more actions to be taken in response to such a determination.

In certain example embodiments, a received signature may be determined to match a stored signature if absolute equivalence exists. In other example embodiments, however, absolute equivalence may not be required, and a match may be determined to exist if a received signature corresponds to a stored signature within a certain tolerance band. For example, in those example embodiments in which a set of signatures for an ad creative is accumulated over time as the advertisement is served in accordance with targeting criteria associated with the advertisement, a received signature for a rendered impression of the advertisement may be permitted to deviate from the set of signatures as long as the deviation does not exceed a specified threshold amount of deviation. Moreover, the threshold level of permitted deviation may vary over time as the set of signatures expands.

For example, if a relatively small number of signatures have been received for an advertisement that are reflective of a relatively uniform set of targeting attributes, additional signatures that are received may not be determined to be anomalous even if they are reflective of different targeting attributes. However, as the number of served impressions increases, and as the set of received signatures correspondingly expands, the distribution of targeting criteria reflected by the set of signatures may more accurately reflect the targeting criteria associated with the advertisement, and as such, additional signatures that are received that deviate from this expanded set of signatures may be more likely to be deemed anomalous. Stated another way, the threshold amount of deviation that is permitted may decrease as the set of signatures expands.

As previously noted, if a rendered ad creative is determined to be exhibiting anomalous characteristics, one or more responsive actions may be taken in order to mitigate a potential malware-related risk posed by the anomalous ad creative. For example, the ad network may transmit a message to the user device (or more specifically to a validation program or the like executing on the user device) to remove the advertisement from the user's web browser in real-time or near-real-time. Additionally, or alternatively, the ad network may cease serving the anomalous ad creative. As yet another example, the website publisher may prevent the advertisement from being rendered in connection with its hosted web content upon receipt of an indication that the advertisement is demonstrating anomalous characteristics. Still further, anti-virus software executable on the user device may be informed that the advertisement is exhibiting anomalous characteristics and may quarantine the advertisement on the user device. Moreover, a developer of the anti-virus software may be provided with the signature associated with the anomalous advertisement, which may then allow the developer to more quickly generate a signature for the potential malware associated with the advertisement than would otherwise be the case.

In addition, a variety of measures may be taken to determine whether anomalous characteristics demonstrated by an ad creative are, in fact, indicative of malware associated with the ad creative. For example, the ad network may initiate scanning of the ad creative at a greater frequency and by a greater number of scanners than may be typically provided for in order to accumulate a large dataset relating to served impressions of the ad creative. As signatures are received in connection with the serving of impressions of the ad creative, the ad network may execute one or more machine learning algorithms to evaluate various attributes associated with each served impression to determine, over time, those anomalies that are not indicative of malware and those that are. For example, based on this increased dataset associated with the anomalous advertisement, the ad network may be able to determine whether particular types of users, geographies, and so forth are being targeted for malware.

Conventional solutions suffer from a number of drawbacks that significantly hinder the likelihood of identifying anomalous advertisements. For example, conventional solutions may attempt to render an impression of an advertisement on a particular device in order to evaluate the advertisement as it is rendered and determine whether the advertisement is exhibiting anomalous characteristics. However, malware may be associated with certain targeting constraints which may not be known, and if attributes of the device attempting to scan for the advertisement (or user attributes associated with the device) fail to satisfy those targeting constraints, the advertisement may, in fact, never be rendered on the scanning device.

In addition, malvertisers, hackers, or the like typically probe for opportunities to deliver malware via online advertising at a very low frequency. According, the scanning frequency and breadth of scanners that would be necessary to detect malware associated with such a low probe frequency would be practically infeasible. In a typical scenario, a malvertiser may first attempt to identify a vulnerability in a web browser, a web page construction, a mechanism for delivering an advertisement, or the like. Once such a vulnerability is identified, the malvertiser may then attempt to exploit that vulnerability to deliver some amount of payload. However, even at this stage, the malvertiser may not yet attempt full-scale malware delivery. Rather, once the malvertiser determines a mechanism for delivering malware, the malvertiser may select a particular timeframe when malware monitoring may be scaled back (e.g., a holiday period) to begin delivering the malware. Accordingly, conventional solutions are also inadequate because they are incapable of detecting malware until a malvertiser has begun full-scale malware delivery.

Yet another drawback with conventional solutions is their inability to effectively scan the large number of ad creatives that may be served through an ad network. For example, a large number of creatives may be cycled through for association with a particular ad tag, and thus, any practically feasible scanning frequency is unlikely to detect malware that be associated with any particular ad creative.

Embodiments of the disclosure provide a number of technical contributions over conventional solutions including, but not limited to, the capability to detect anomalous advertisements earlier and more efficiently. Technical effects of embodiments of the disclosure include, but are not limited to, elimination of the drawbacks associated with server-side polling noted above (e.g., failure to meet targeting constraints, low probe frequency requiring an unfeasibly high scanning frequency, large number of ad creatives to scan, etc.) by providing client-side functionality capable of determining ad creative information or a signature associated with an ad creative being rendered and transmitting the ad creative information or signature to an ad network. The ad network may then perform processing (as discussed above) to determine whether the ad creative is exhibiting anomalous characteristics and take or direct one or more actions to be taken responsive thereto. As such, in accordance with example embodiments of the disclosure, the ad network is configured to detect anomalous advertisements earlier and more effectively than conventional solutions by, among other things, relying on client-side functionality to perform processing that would otherwise be performed ineffectively server-side in conventional solutions.

In addition to eliminating drawbacks associated with server-side polling, providing client-side functionality in accordance with example embodiments of the disclosure eliminates certain disadvantages associated with providing similar functionality server-side. For example, while it may be possible for an ad network to render an advertisement on its own server, and then only serve an impression of the advertisement on a user device if the advertisement is determined to be free of malware, the latency costs and false measurement consequences associated with this approach make it practically infeasible.

First, pre-loading an advertisement on the ad network would likely take multiple seconds, and the resultant delay in serving an impression of the advertisement would be highly disruptive to the customer experience. Other the other hand, providing such functionality client-side provides the technical effect of permitting per-impression inspection of the ad creative without introducing the latency delays noted above. Second, pre-loading the advertisement on the ad network may result in double counting of impressions. More specifically, a third-party ad server (e.g., a marketer's ad server) may receive an indication that an advertisement has been pre-loaded on an ad network server and may count an impression as having been served. If an impression is then served on a user device, another impression may be counted. As such two impressions may be counted when in actuality only the impression served on the user device should be counted. Providing the functionality for determining ad creative information or a signature associated with an ad creative on the client-side as the ad creative is being rendered on a user device, provides a technical effect of avoiding double counting of impressions.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings. In addition, it should be appreciated that the example technical effects described above are merely illustrative and not exhaustive.

Illustrative System Architecture

FIG. 1 is a schematic diagram depicting an illustrative architecture 100 in which a potentially anomalous advertisement may be rendered on a user device in accordance with one or more example embodiments of the disclosure.

The illustrative architecture 100 may include one or more advertising ("ad") network servers 102, one or more website publisher servers 104, one or more user devices 106 operable by one or more users, and one or more third-party ad servers 108.

The ad network server(s) 102, the website publisher server(s) 104, and the third party ad server(s) 108 may each include any suitable one or more computing devices including, but not limited to, a server computer, a mainframe computer, a workstation, a desktop computer, a laptop computer, and so forth. The user device(s) 106 may include any suitable user device including, but not limited to, a smartphone or other cellular device, a tablet device, an electronic reader device, a desktop computing device, a laptop computing device, a gaming console, a multimedia content streaming device, a television such as Smart TV, or any other device capable of receiving ad creative content and other content (e.g., web content) over one or more networks and rendering the content for presentation to a user. While various illustrative components of the architecture 100 may be described herein in the singular, it should be appreciated that multiple ones of any such components may be provided in various example embodiments of the disclosure.

The ad network server 102, the website publisher server 104, the user device 106, and the third-party ad server 108 may each be configured to communicate with one or more other entities of the architecture 100 via one or more networks 110. The network(s) 110 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 110 may have any suitable communication range associated therewith and may include, for example, global networks (e.g., the Internet), metropolitan area networks (MANs), wide area networks (WANs), local area networks (LANs), or personal area networks (PANs). In addition, the network(s) 110 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The ad network server 102 may store data 112 obtained as a result of pre-registration of ad creatives or as a result of the rendering of ad creatives on user devices 106. The data 112 is illustratively depicted in FIG. 1 as including respective ad creative information and at least one respective corresponding signature associated with each of the ad creatives 1-N. For example, the stored data 112 may include respective ad creative information 114 and a respective corresponding signature 116 for an example ad creative 1. The ad creative information stored for any particular ad creative may include information that identifies one or more assets forming part of the ad creative and metadata associated with the asset(s). A stored signature for any particular ad creative may be a value or collection of values that uniquely identifies a particular state of the ad creative. In certain example embodiments, a signature may be a hash value generated by applying a cryptographic hash function to at least a portion of ad creative information associated with an ad creative.

Pre-registration of an ad creative may involve receipt of the ad creative from, for example, a third-party ad server 108 and identification of a structural representation of the ad creative. The structural representation may be, for example, a DOM tree including a set of nodes where each node may be associated with an asset of the ad creative and corresponding metadata such as a domain storing the asset; size, content, placement, or other attributes of the asset; and so forth. The structural representation of the ad creative may then be traversed or otherwise evaluated to capture ad creative information relating to the ad creative assets forming part of the ad creative and the associated metadata. At least a portion of the ad creative information may then be provided as input to a cryptographic hash function or the like to generate a hash value that may serve as a unique signature of a particular state of the ad creative.

In certain other example embodiments of the disclosure, the ad network server 102 may not obtain ad creative information via pre-registration of an ad creative but may acquire the ad creative information over time as impressions of the advertisement are served. For example, in those example scenarios in which an ad creative is associated with a set of targeting constraints, the ad network server 102 may receive respective ad creative information associated with each served impression of the advertisement. A cryptographic hash function may be applied to the received ad creative information to generate a set of signatures (e.g., set 120) associated with the ad creative. As impressions of the advertisement continue to be served, the set of signatures may be expanded to include additional signatures reflective of the respective targeting attributes and other attributes associated with each served ad impression. The targeting constraints, attributes, or criteria may include, but are not limited to, geographic targeting criteria, user demographic or other user attribute targeting criteria, ad placement targeting criteria (e.g., an above-the-fold ad placement targeting constraint), contextual targeting criteria, and so forth.

It should be appreciated that rather than receiving ad creative information from a user device on which an ad creative is served and then generating a corresponding signature, the ad network server 102 may instead receive the signature itself from the user device 106. For example, the ad network server 102 may have received the example set 120 of signatures without having received the corresponding ad creative information 118. That is, a user device 106 may generate a signature associated with a served ad impression and transmit the signature to the ad network server 102. In addition, in various example embodiments, the ad network server 102 may pre-register an ad creative to determine corresponding ad creative information and to generate a corresponding initial signature, and may further supplement the initial signature with additional signatures corresponding to served impressions of the ad creative.

The process for rendering an advertisement on a user device 106 may involve interaction between a number of entities including the website publisher server 104, an ad server associated with the website publisher, an ad server associated with an advertiser or marketer, and a content delivery network (CDN). The website publisher's ad server and the marketer's ad server may each correspond to a third-party ad server 108. Further, in certain example embodiments, the CDN may include one or more of the ad network servers 102.

In an example ad serving scenario, a user may cause a web browser 122 executing on the user device 106 to navigate to a web page 124 hosted by the website publisher server 104, responsive to which, the web browser 122 may transmit a request to the website publisher server 104 (e.g., a GET request in Hypertext Transfer Protocol (HTTP) parlance) for web content 126 associated with the web page 124. In response, the website publisher server 104 may transmit, to the web browser 122, computer-executable code (e.g., Hypertext Markup Language (HTML) code) that may include a coded link known as an ad tag that may point the web browser 122 to the publisher's ad server (e.g., a third-party ad server 108). The publisher's ad server may, in fact, include multiple networked servers operated by an entity other than the publisher.

The publisher's ad server may execute any number of algorithms to determine which advertisement to serve in available advertising inventory on the web page 124. Such algorithms may receive any number of inputs for selecting an advertisement including, but not limited to, ad creative attributes, behavioral targeting criteria, contextual targeting criteria, or the like. Upon selecting a particular advertisement to serve, the publisher's ad server may transmit an ad tag to the web browser 122, resulting in a second redirection of the web browser 122 to the marketer's ad server. In certain cases, upon transmitting the redirect to the marketer's ad server, the publisher's ad server may count an impression as having been served even though the actual ad creative content has not yet been transmitted to the user device 106.

Upon being redirected to the marketer's ad server, the web browser 122 may be redirected yet again to a CDN including networked servers that actually store the ad creative assets forming part of the advertisement. In certain example embodiments, the ad network server 102 may form part of the CDN. Storing the ad creative assets at the CDN rather than at the marketer's ad server may reduce latency associated with delivering the advertisement to the user device 106. The ad creative content 128 may then be transmitted from the CDN to the user device 106 for rendering by the web browser 122 on the web page 124. In certain example scenarios, the marketer's ad server may also transmit a redirect back to itself in connection with the redirect to the CDN. This additional redirect may include a query string that is called by the web browser 122 to fetch a 1×1 pixel (e.g., a tracking pixel) from the marketer's ad server. Upon receiving the query for the 1×1 pixel, the marketer's ad server may presume that the advertisement was successfully loaded and may count an impression of the advertisement as having been served.

It should be appreciated that various modifications or alternatives to the above-described example ad serving scenario are within the scope of this disclosure. For example, the ad network server(s) 102 may instead form part of an ad exchange capable of support real-time-bidding (RTB) on ad impressions. Further, any portion of the respective functionality described as being supported by the publisher's ad server or the marketer's ad server may be additionally or alternatively supported by the an ad network server 102. For example, while the publisher's ad server is described as making ad selection decisions, such functionality may alternatively be supported by the ad network server 102. As another example, while the publisher's ad server and the marketer's ad server are each described as tracking impressions, such functionality may be additionally or alternatively supported by the ad network server 102. In addition, while the ad creative 128 is described as being stored at a CDN that may include one or more ad network servers 102, it should be appreciated that one or more third-party ad servers 108 (e.g., the marketer's ad server) may store and transmit the ad creative content 128 to the user device 106.

An example ad creative 128 is depicted in FIG. 1 as being rendered by the web browser 122 in an available advertising slot on the web page 124. In accordance with one or more example embodiments of the disclosure, client-side functionality may be provided to capture ad creative information associated with the ad creative 128 served on the user device 106. Similar to the functionality supported by the ad network server 102 described above, the client-side functionality may be configured to identify (or generate) a structural representation of the ad creative 128 (e.g., a DOM tree) and evaluate the structural representation (e.g., traverse the DOM tree) to capture ad creative information associated with the ad creative 128.

The client-side functionality may be further configured to generate a signature 130 that uniquely identifies a state of the rendered ad creative 128 by, for example, executing a cryptographic hash function that receives at least a portion of the ad creative information as input and outputs a hash value associated with the rendered ad creative 128. The client-side functionality may direct transmission of the ad creative information (e.g., a payload indicative of the ad creative 128 rendered on the client device 106) or the generated signature 130 to the ad network server 102 which may, in turn, compare the received ad creative information or signature 130 to the stored data 112 to determine whether the ad creative 128 rendered on the user device is exhibiting anomalous characteristics. While the signature 130 is illustratively depicted as corresponding to ad creative N—which may not have been pre-registered and for which a set 120 of multiple signatures may have been previously received (or generated) and stored as part of the stored data 112—it should be appreciated that the signature 130 may correspond to any ad creative, including an ad creative (e.g., ad creative 1) that has been pre-registered.

As previously described, the client-side functionality may take on any of a variety of forms including, but not limited to, a validation program that the ad network server 102 may embed in a wrapper or container that also includes the ad creative 128, a web browser extension (e.g., a browser toolbar, plug-in, add-on, etc.) of the web browser 122 that may operate in conjunction with a validation program provided by the ad network server 102, a validation program integrated with or otherwise provided in association with the web content 126 hosted by the website publisher server 104, native functionality supported by a browser application (e.g., the web browser 122) which is provided by an entity that is the same as or which is affiliated with an entity that operates the ad network server 102, and so forth. The client-side functionality and functionality supported by the ad network server 102 for detecting anomalous advertisements based on signature deviations will be described in more detail hereinafter through reference to FIGS. 2-6.

Figure 2:
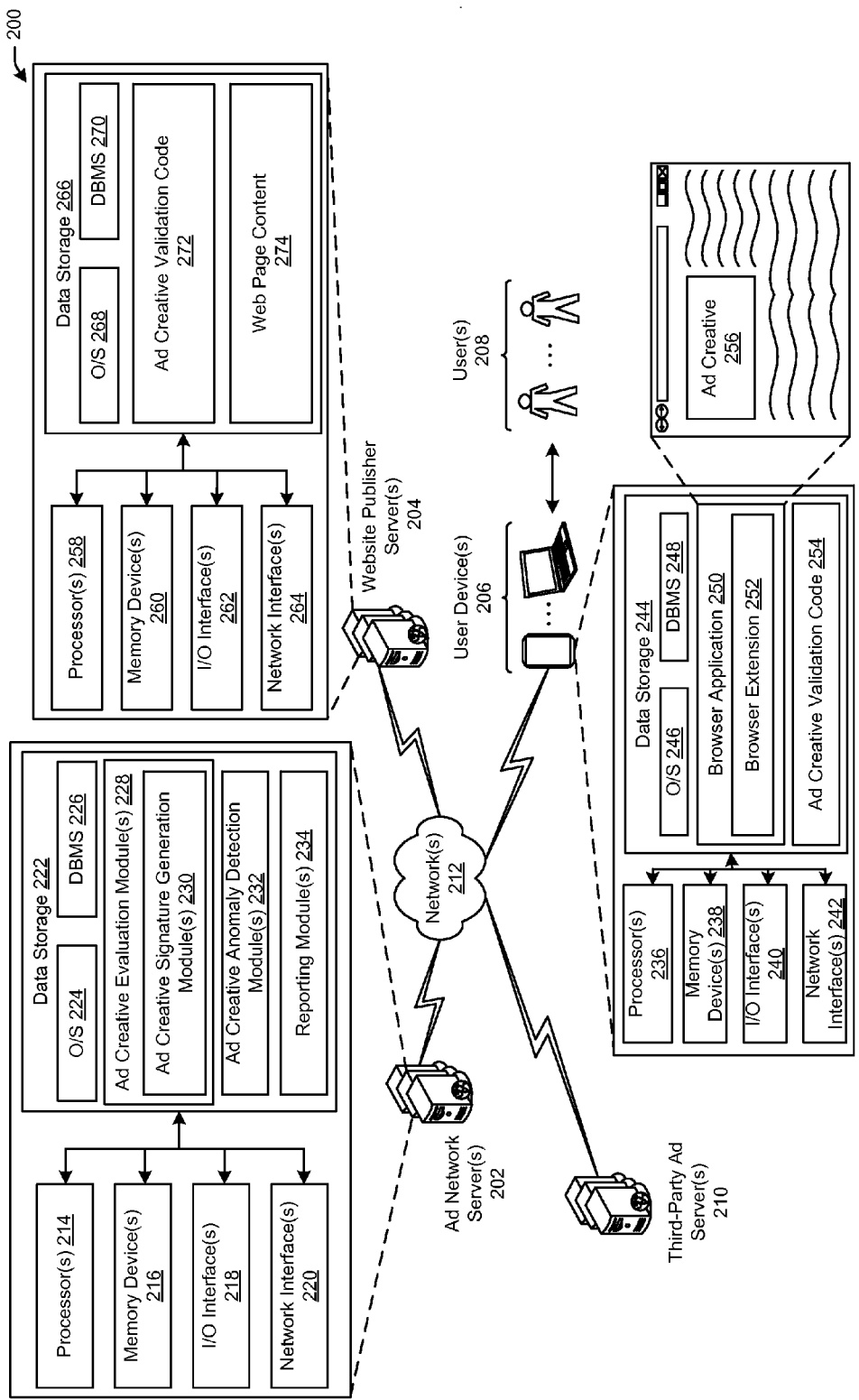
FIG. 2 is a schematic block diagram of an illustrative system architecture including various illustrative hardware and software components for detecting anomalous advertisements in accordance with one or more example embodiments of the disclosure.

FIG. 2 is a schematic block diagram of an illustrative system architecture 200 including various illustrative hardware and software components for detecting anomalous advertisements in accordance with one or more example embodiments of the disclosure.

The illustrative system architecture 200 depicted in FIG. 2 may correspond to the illustrative architecture 100 depicted in FIG. 1 and may include one or more ad network servers 202, one or more website publisher servers 204, one or more user devices 206 operable by one or more users 208, and one or more third-party ad servers 210, each of which may be configured to communicate with one or more other components of the architecture 200 via one or more networks 212.

The ad network server(s) 202, the website publisher server(s) 204, the user device(s) 206, and the third-party ad server(s) 210 may, in various example embodiments, respectively correspond to the ad network server(s) 102, the website publisher server(s) 104, the user device(s) 106, and the third-party ad server(s) 208 depicted in FIG. 1, and may include any of the representative types of devices described with respect to these corresponding components of the architecture 100. In addition, the network(s) 212 may include any of the types of networks described with respect to network(s) 110 of the architecture 100. While various illustrative components of the system architecture 200 may be described herein in the singular, it should be appreciated that multiple ones of any such components may be provided in various example embodiments of the disclosure.

In an illustrative configuration, the ad network server 202 may include one or more processors (processor(s)) 214, one or more memory devices 216 (generically referred to herein as memory 216), one or more input/output ("I/O") interface(s) 218, one or more network interface(s) 220, and data storage 222. These various components will be described in more detail hereinafter.

The memory 216 of the ad network server 202 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 216 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 216 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 222 may include removable storage and/or non-removable storage including, but not limited to, magnetic storage, optical disk storage, and/or tape storage. The data storage 222 may provide non-transient storage of computer-executable instructions and other data. The data storage 222 may include storage that is internal and/or external to the ad network server 202. The memory 216 and the data storage 222, removable and/or non-removable, are examples of computer-readable storage media (CRSM) as that term is used herein.

The data storage 222 may store computer-executable instructions that are loadable into the memory 216 and executable by the processor(s) 214 to cause various operations to be performed. The data storage 222 may additionally store data that may be copied to memory 216 for use by the processor(s) 214 during the execution of the computer-executable instructions. Moreover, output data generated as a result of execution of the computer-executable instructions by the processor(s) 214 may be stored initially in memory 216, and may ultimately be copied to data storage 222 for non-transient storage.

More specifically, the data storage 222 may store one or more operating systems (O/S) 224; one or more database management systems (DBMS) 226; and one or more program modules, applications, or the like such as, for example, one or more ad creative evaluation modules 228, one or more ad creative anomaly detection modules 232, one or more reporting modules 234, and so forth. The ad creative evaluation module(s) 228 may further include one or more sub-modules such as, for example, one or more ad creative signature generation modules 230.

The ad creative evaluation module(s) 228 may include computer-executable instructions that, responsive to execution by the processor(s) 214, may cause operations to be performed to identify (or generate) a structural representation of an ad creative and evaluate the structural representation to capture or determine ad creative information associated with the ad creative. The structural representation of the ad creative may be, for example, a DOM tree and evaluation of the structural representation may include traversal of the DOM tree. As previously described, the ad creative information may include information identifying asset(s) forming part of the ad creative and associated metadata such as, for example, a domain storing the asset; size, content, placement, or other attributes of the asset; and so forth.

In accordance with one or more example embodiments of the disclosure, computer-executable instructions provided as part of the ad creative evaluation module(s) 228 may be executed as part of a pre-registration process for an ad creative. In certain other example embodiments of the disclosure, and in addition to or in lieu of pre-registration of an ad creative, ad creative information or ad creative signatures may be acquired over time as impressions of the advertisement are served. For example, in those example scenarios in which an ad creative is associated with a set of targeting constraints, the ad network server 202 may receive respective ad creative information or a respective signature associated with each served impression of the advertisement.

Upon receipt or determination of the ad creative information, computer-executable instructions provided as part of the ad creative signature generation module(s) 230 may be executed to generate a signature associated with the ad creative based at least in part on the ad creative information. For example, computer-executable instructions provided as part of the ad creative signature generation module(s) 230 may be executed to apply a cryptographic hash function to at least a portion of ad creative information to generate a hash value that uniquely identifies a state of the ad creative as embodied by the ad creative information. The cryptographic hash function may include, but is not limited to, any of the family of secure hash algorithms (e.g., SHA-0, SHA-1, SHA-2, or SHA-3) published by the National Institute of Standards and Technology (NIST), the MD5 message-digest algorithm, and so forth. The hash value generated by the cryptographic hash function may be of any suitable size (e.g., 128-bit, 160-bit, 256-bit, 512-bit, etc.).

In various example embodiments, various measures may be taken to make it more difficult for a malvertiser to detect a hash value indicative of an initial state of an ad creative or to detect a hash function used to generate the hash value. For example, in certain example embodiments, multiple candidate hash functions may be generated and a particular hash function may be selected to generate the hash value. A different hash function of the multiple candidate hash functions may then be periodically selected to generate the hash value. In other example embodiments, a hash function may be periodically refreshed or updated such that the corresponding hash values that are generated periodically change. In still other example embodiments, multiple hash values may be generated to correspond to an initial state of an ad creative.

As previously noted, in certain example embodiments of the disclosure, the ad network server 202 may generate a signature associated with a served impression of an ad creative based on corresponding ad creative information received from, for example, a user device 206 on which the impression was served. Alternatively, the ad network server 202 may receive the signature from the user device 206. Accordingly, the ad network server 202 may store a set of signatures associated with impressions of an ad creative served over time. As impressions of the advertisement continue to be served, the set of signatures may be expanded to include additional signatures reflective of the respective targeting attributes and other attributes associated with each served ad impression.

As previously noted, in accordance with one or more example embodiments of the disclosure, client-side functionality may be provided to capture ad creative information indicative of the structure of an advertisement being served on a user device 206. Similar to the functionality supported by the ad network server 202 described above, the client-side functionality may be configured to identify (or generate) a structural representation of an ad creative (e.g., a DOM tree) and evaluate the structural representation (e.g., traverse the DOM tree) to capture ad creative information contained within the structural representation. The client-side functionality may evaluate the structural representation of the ad creative responsive to rendering of the ad creative. The client-side functionality may be further configured to generate a signature associated with the rendered ad creative based at least in part on at least a portion of the captured ad creative information.

The client-side functionality may direct transmission of the ad creative information (e.g., a payload indicative of the ad creative rendered on the user device 206) or the generated signature to the ad network server 202. Computer-executable instructions provided as part of the ad creative anomaly detection module(s) 232 may then be executed to perform a comparison of the received signature (or a signature generated by the ad network server 202 based on received ad creative information) to stored signatures to determine whether the ad creative rendered on the user device 206 is exhibiting anomalous characteristics. Alternatively, computer-executable instructions of the ad creative anomaly detection module(s) 232 may be executed to perform a comparison of received ad creative information to stored ad creative information.

In certain example embodiments, if the ad creative anomaly detection module(s) 232 detect a match, it may be determined that the rendered ad creative is not exhibiting anomalous characteristics. On the other hand, in certain other example embodiments, if a match is not detected, it may be determined that the rendered ad creative is exhibiting anomalous characteristics, and the ad network server 202 may proceed to take or direct one or more actions to be taken in response to such a determination.

In certain example embodiments, a received or generated signature associated with a rendered ad creative may be determined to match a stored signature if absolute equivalence exists. In other example embodiments, however, absolute equivalence may not be required, and a match may be determined to exist if a received signature corresponds to a stored signature within a certain tolerance band. For example, a received signature for a rendered impression of an ad creative may be permitted to deviate from the set of stored signatures associated with the ad creative as long as the deviation does not exceed a specified threshold amount of deviation. Moreover, the threshold level of permitted deviation may vary over time as the set of signatures expands.

As previously noted, if a rendered ad creative is determined to be exhibiting anomalous characteristics, one or more responsive actions may be taken in order to mitigate a potential malware-related risk posed by the anomalous ad creative. For example, computer-executable instructions provided as part of the reporting module(s) 234 may be executed to cause a message to be transmitted to a user device 206 on which the ad creative is being rendered (or more specifically to a validation program or the like executing on the user device 206) to remove the advertisement from the web browser in real-time or near-real-time. Additionally, or alternatively, the ad network server 202 may cease serving the anomalous ad creative. As yet another example, computer-executable instructions provided as part of the reporting module(s) 234 may be executed to cause a message to be transmitted to the website publisher server 204 to prevent the advertisement from being rendered in connection with its hosted web content. Still further, computer-executable instructions provided as part of the reporting module(s) 234 may be executed to cause a message to be transmitted to anti-virus software executable on the user device 206 to inform the anti-virus software that the advertisement is exhibiting anomalous characteristics, in response to which, the anti-virus software may quarantine the advertisement on the user device.

The ad network server 202 may further support additional functionality for taking any of a variety of measures to determine whether anomalous characteristics demonstrated by an ad creative are, in fact, indicative of malware associated with the creative. Such functionality may be provided as part of the ad creative anomaly detection module(s) 232 or as part of one or more additional modules not depicted in FIG. 2. Such functionality may include, for example, scanning for the ad creative at a greater frequency and using a greater number of scanners than may be typically provided for in order to accumulate a large dataset relating to served impressions of the ad creative. As signatures are received (or generated based on received ad creative information) in connection with served impressions of the ad creative, one or more machine learning algorithms may be executed to evaluate various attributes associated with each served impression. In this manner, which anomalies are indicative of malware and which are not may be determined over time. For example, based on this increased dataset associated with an anomalous advertisement, the ad network server 202 may be able to determine whether particular types of users, geographies, and so forth are being targeted for malware.

Referring now to other illustrative components of the ad network server 202, the O/S 224 may be loaded into the memory 216 and may provide an interface between other application software executing on the ad network server 202 and hardware resources of ad network server 202. More specifically, the O/S 224 may include a set of computer-executable instructions for managing hardware resources of the ad network server 202 and for providing common services to other application programs (e.g., managing memory allocation among various application programs). The O/S 224 may include any operating system now known or which may be developed in the future including, but not limited to, any server operating system, any mainframe operating system, or any other proprietary or non-proprietary operating system.

The DBMS 226 may be loaded into the memory 216 and may support functionality for accessing, retrieving, storing, and/or manipulating data stored in one or more of the datastores (not shown), data stored in the memory 216, and/or data stored in the data storage 222. The DBMS 226 may use any of a variety of database models (e.g., relational model, object model, etc.) and may support any of a variety of query languages. The datastore(s) may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastore(s) may represent data in one or more data schemas.

It should be appreciated that in certain example embodiments, alternative data storage/access technologies may be employed in lieu of or in addition to the DBMS 226. For example, in various example embodiments, a streaming data store such as a queue, buffer, or the like may be provided for real-time or near-real-time data access. Any of the example types of data previously discussed (e.g., ad creative information, signatures, etc.) may be stored in and accessed from such a streaming data store.

The processor(s) 214 may be configured to access the memory 216 and execute computer-executable instructions stored therein. For example, the processor(s) 214 may be configured to execute computer-executable instructions of the various program modules of the ad network server 202 to cause or facilitate various operations to be performed in accordance with one or more embodiments of the disclosure. The processor(s) 214 may include any suitable processing unit capable of accepting data as input, processing the input data in accordance with stored computer-executable instructions, and generating output data. The processor(s) 214 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 214 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 214 may be capable of supporting any of a variety of instruction sets.

The ad network server 202 may further include one or more input/output (I/O) interfaces 218 that may facilitate the receipt of input information by the ad network server 202 from one or more I/O devices as well as the output of information from the ad network server 202 to the one or more I/O devices. The I/O devices may include, for example, one or more user interface devices that facilitate interaction between a user and the ad network server 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The ad network server 202 may be configured to communicate with any of a variety of other systems, platforms, networks, devices, and so forth (e.g., a third-party ad server 210, a website publisher server 204, a user device 206, etc.) via one or more of the network(s) 212. The ad network server 202 may include one or more network interfaces 220 that may facilitate communication between the ad network server 202 and any of the systems, networks, platforms, devices, or components of the system architecture 200.

Referring now to other illustrative components of the architecture 200, in an illustrative configuration, a user device 206 may include one or more processors (processor(s)) 236, one or more memory devices 238 (generically referred to herein as memory 238), one or more input/output ("I/O") interface(s) 240, one or more network interface(s) 242, and data storage 244. These various components will be described in more detail hereinafter.

The memory 238 of the user device 206 may include any of the types or forms of memory discussed through reference to the memory 216 of the ad network server 202. Similarly, the data storage 244 may include any of the types or forms of data storage described through reference to the data storage 222 of the ad network server 202. The memory 238 and the data storage 244, removable and/or non-removable, are examples of computer-readable storage media (CRSM) as that term is used herein.

The data storage 244 may store computer-executable instructions that are loadable into the memory 238 and executable by the processor(s) 236 to cause various operations to be performed. The data storage 244 may additionally store data that may be copied to memory 238 for use by the processor(s) 236 during the execution of the computer-executable instructions. Moreover, output data generated as a result of execution of the computer-executable instructions by the processor(s) 236 may be stored initially in memory 238, and may ultimately be copied to data storage 244 for non-transient storage.

More specifically, the data storage 244 may store one or more operating systems (O/S) 246; one or more database management systems (DBMS) 248; and one or more program modules, applications, or the like such as, for example, a browser application 250, a browser extension 252, ad creative validation code 254, and so forth.

The browser application 250 may include any suitable desktop or mobile browser application and may correspond to the web browser 122 depicted in FIG. 1. The browser extension 252 may include computer-executable code that extends the functionality of the browser application 250. The browser extension 252 may be generated based on an architecture and a set of Application Programming Interface(s) (API(s)) associated with the browser application 250. In certain example embodiments, the browser extension 252 may be generated using a development framework that allows for cross-browser extensions to be generated using a single code base and API. Depending on the type of browser application 250, the browser extension 252 may correspond to a browser plugin, add-on, toolbar, or the like.

In addition, the data storage 244 may include computer-executable ad creative validation code 254. The ad creative validation code 254 may include a validation program provided to the user device 206 by the ad network server 202. The ad creative validation code 254 may be provided to the user device 206 in any of a variety of formats and/or via any of a variety of delivery mechanisms. For example, in certain example embodiments, the ad network server 202 may embed an ad creative 256 in a wrapper or container. The wrapper or container may be, for example, an HTML iframe or any other suitable construct for encapsulating the ad creative 256. The ad network server 202 may then embed the ad creative validation code 254 in the same wrapper or container in which the ad creative 256 is embedded. The ad creative validation code 254 may be executed on the user device 206 responsive to loading of the ad creative 256. More specifically, computer-executable instructions of the ad creative validation code 254 may be executed to identify (or generate) a structural representation (e.g., a DOM tree) of the ad creative 256 being rendered and to evaluate the structural representation (e.g., traverse the DOM tree) to capture ad creative information including information identifying ad creative asset(s) forming part of the ad creative 256 and associated metadata. The ad creative validation code 254 may be written in any suitable language such as a dynamic language that supports scripts (e.g., a scripting language such as Javascript™). Scripts may include computer-executable code that is interpreted rather than compiled at run-time.

In certain example embodiments, a third-party ad server 210 may provide the ad network server 202 with an ad creative 256 that includes embedded wrappers, containers, or the like (e.g., HTML iframes). In such example embodiments, due to the presence of the iframes within the ad creative 256, evaluation of the structural representation of the ad creative 256 may not be feasible if the ad creative validation code 254 is embedded in a same wrapper or container as the ad creative 256. For example, ad creative validation code 254 that is received within a same wrapper or container as the ad creative 256 may not have adequate rights or permissions to information included within the embedded iframes of the ad creative 256. In such example embodiments, the browser extension 252 may, however, possess such rights or permissions and may be capable of traversing through iframes (e.g., iframes embedded in the ad creative 256) that embedded ad creative validation code 254 would be prevented from accessing. In certain example embodiments, however, the ad creative validation code 254 may nonetheless operate in conjunction with the browser extension 252 to identify and evaluate a structural representation of the ad creative 256. For example, the ad creative validation code 254 may include a sentinel validation program that facilitates detection of the ad creative 256 by the browser extension 252. Upon detecting the ad creative 256, the browser extension 252 may proceed to identify the structural representation of the ad creative (e.g., a DOM tree) and evaluate the structural representation (e.g., traverse the DOM tree) to capture ad creative information associated with the ad creative 256.

In yet other example embodiments, the browser application 250 may be provided by an entity that is the same or which is affiliated with an entity that operates the ad network server 202. In such embodiments, the ad creative validation code 254 may be integrated with other native functionality supported by the browser application 250. As will be described in more detail later in this disclosure, in still further embodiments, ad creative validation code may be provided to a website publisher server 204 which may, in turn, integrate the ad creative validation code with web content (e.g., HTML content) hosted by the website publisher server 204.

Example types of client-side functionality described herein for capturing ad creative information associated with a rendered impression of an ad creative are merely illustrative and not exhaustive. It should be appreciated that various other mechanisms for providing such functionality are within the scope of this disclosure. For example, while a toolbar or the like has been described as an example type of browser extension 252 for evaluating a rendered ad creative and capturing ad creative information, it should be appreciated that the ad creative validation code 254 (e.g., a Javascript™ program) may be provided in the form of a toolbar.

Once ad creative information is captured via any of the mechanisms described above, computer-executable instructions provided as part of the ad creative validation code 254, the browser extension 252, and/or the browser application 250 generally may be executed to generate a signature associated with the rendered ad creative based at least in part on the captured ad creative information. As previously described, the signature may be a hash value generated using any suitable cryptographic hash function. Computer-executable instructions provided as part of the ad creative validation code 254, the browser extension 252, and/or the browser application 250 generally may then be executed to cause the ad creative information (e.g., a payload indicative of the ad creative 256 rendered on the user device 206) or the generated signature to be transmitted to the ad network server 202. Thereafter, as described above, computer-executable instructions provided as part of the ad creative anomaly detection module(s) 232 may be executed to determine whether the rendered ad creative 256 is exhibiting anomalous characteristics.

Referring now to other illustrative components of the user device 206, the O/S 246 may be loaded into the memory 238 and may provide an interface between other application software executing on the user device 206 and hardware resources of the user device 206. More specifically, the O/S 246 may include a set of computer-executable instructions for managing hardware resources of the user device 206 and for providing common services to other application programs (e.g., managing memory allocation among various application programs). The O/S 246 may include any operating system now known or which may be developed in the future including, but not limited to, any server operating system, any mainframe operating system, or any other proprietary or non-proprietary operating system.

The DBMS 248 may be loaded into the memory 238 and may support functionality for accessing, retrieving, storing, and/or manipulating data stored in one or more of the datastores (not shown), data stored in the memory 238, and/or data stored in the data storage 244. The DBMS 248 may use any of a variety of database models (e.g., relational model, object model, etc.) and may support any of a variety of query languages. The datastore(s) may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastore(s) may represent data in one or more data schemas.

The processor(s) 236 may be configured to access the memory 238 and execute computer-executable instructions stored therein. For example, the processor(s) 236 may be configured to execute computer-executable instructions of the various program modules, applications, or the like of the user device 206 to cause or facilitate various operations to be performed in accordance with one or more embodiments of the disclosure. The processor(s) 236 may include any suitable processing unit capable of accepting data as input, processing the input data in accordance with stored computer-executable instructions, and generating output data. The processor(s) 236 may include any type of suitable processing unit including any of the types of processing units described through reference to the processor(s) 214 of the ad network server 202. Further, the processor(s) 236 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 236 may be capable of supporting any of a variety of instruction sets.

The user device 206 may further include one or more input/output (I/O) interfaces 240 that may facilitate the receipt of input information by the user device 206 from one or more I/O devices as well as the output of information from the user device 206 to the one or more I/O devices. The I/O devices may include, for example, one or more user interface devices that facilitate interaction between a user and the user device 206 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The user device 206 may be configured to communicate with any of a variety of other systems, platforms, networks, devices, and so forth (e.g., the ad network server 202, the website publisher computer 204, a third-party ad server 210, etc.) via one or more of the network(s) 212. The user device 206 may include one or more network interfaces 242 that may facilitate communication between the user device 206 and any of the systems, networks, platforms, devices, or components of the system architecture 200.

Referring now to still other illustrative components of the architecture 200, in an illustrative configuration, a website publisher server 204 may include one or more processors (processor(s)) 258, one or more memory devices 260 (generically referred to herein as memory 260), one or more input/output ("I/O") interface(s) 262, one or more network interface(s) 264, and data storage 266. These various components will be described in more detail hereinafter.

The memory 260 of the website publisher server 204 may include any of the types or forms of memory discussed through reference to the memory 216 of the ad network server 202. Similarly, the data storage 266 may include any of the types or forms of data storage described through reference to the data storage 222 of the ad network server 202. The memory 260 and the data storage 266, removable and/or non-removable, are examples of computer-readable storage media (CRSM) as that term is used herein.

The data storage 266 may store computer-executable instructions that are loadable into the memory 260 and executable by the processor(s) 258 to cause various operations to be performed. The data storage 266 may additionally store data that may be copied to memory 260 for use by the processor(s) 258 during the execution of the computer-executable instructions. Moreover, output data generated as a result of execution of the computer-executable instructions by the processor(s) 258 may be stored initially in memory 260, and may ultimately be copied to data storage 266 for non-transient storage.

More specifically, the data storage 266 may store one or more operating systems (O/S) 268; one or more database management systems (DBMS) 270; and one or more program modules, applications, or the like such as, for example, ad creative validation code 272, web page content 274, and so forth.

The ad creative validation code 272 may include a validation program provided to the website publisher server 204 by the ad network server 202. The ad creative validation code 272 may be integrated with or otherwise associated with the web page content 274, and may be provided to the browser application 250 along with the web page content 274 in response to a request for the web page content 270. Upon receipt of the ad creative validation code 272, the processor(s) 236 of the user device 206 may be configured to execute the ad creative validation code 272 to capture ad creative information associated with the ad creative 256 being loaded on the user device 206 in a manner similar to example embodiments described above. Integrating or otherwise associating the ad creative validation code 272 with the web page content 274 may obviate the need for the browser extension 250 and/or the ad creative validation code 254 to perform similar functions.

Once the ad creative information is captured, computer-executable instructions provided as part of the ad creative validation code 272 may be executed to generate a signature associated with the rendered ad creative 256 based at least in part on the captured ad creative information. As previously described, the signature may be a hash value generated using any suitable cryptographic hash function. Computer-executable instructions provided as part of the ad creative validation code 272 may then be executed to cause the ad creative information (e.g., a payload indicative of the ad creative 256 rendered on the user device 206) or the generated signature to be transmitted to the ad network server 202. Thereafter, as described above, computer-executable instructions provided as part of the ad creative anomaly detection module(s) 232 may be executed to determine whether the rendered ad creative 256 is exhibiting anomalous characteristics.

Referring now to other illustrative components of the website publisher server 204, the O/S 268 may be loaded into the memory 260 and may provide an interface between other application software executing on the website publisher server 204 and hardware resources of the website publisher server 204. More specifically, the O/S 268 may include a set of computer-executable instructions for managing hardware resources of the website publisher server 204 and for providing common services to other application programs (e.g., managing memory allocation among various application programs). The O/S 268 may include any operating system now known or which may be developed in the future including, but not limited to, any server operating system, any mainframe operating system, or any other proprietary or non-proprietary operating system.

The DBMS 270 may be loaded into the memory 260 and may support functionality for accessing, retrieving, storing, and/or manipulating data stored in one or more of the datastores (not shown), data stored in the memory 260, and/or data stored in the data storage 266. The DBMS 270 may use any of a variety of database models (e.g., relational model, object model, etc.) and may support any of a variety of query languages. The datastore(s) may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastore(s) may represent data in one or more data schemas.

The processor(s) 258 may be configured to access the memory 260 and execute computer-executable instructions stored therein. For example, the processor(s) 258 may be configured to execute computer-executable instructions of the various program modules, applications, or the like of the website publisher server 204 to cause or facilitate various operations to be performed in accordance with one or more embodiments of the disclosure. The processor(s) 258 may include any suitable processing unit capable of accepting data as input, processing the input data in accordance with stored computer-executable instructions, and generating output data. The processor(s) 258 may include any type of suitable processing unit including any of the types of processing units described through reference to the processor(s) 214 of the ad network server 202. Further, the processor(s) 258 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 258 may be capable of supporting any of a variety of instruction sets.

The website publisher server 204 may further include one or more input/output (I/O) interfaces 262 that may facilitate the receipt of input information by the website publisher server 204 from one or more I/O devices as well as the output of information from the website publisher server 204 to the one or more I/O devices. The I/O devices may include, for example, one or more user interface devices that facilitate interaction between a user and the website publisher server 204 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The website publisher server 204 may be configured to communicate with any of a variety of other systems, platforms, networks, devices, and so forth (e.g., the ad network server 202, a third-party ad server 210, the user device 206, etc.) via one or more of the network(s) 212. The website publisher server 204 may include one or more network interfaces 264 that may facilitate communication between the website publisher server 204 and any of the systems, networks, platforms, devices, or components of the system architecture 200.

Although not explicitly depicted or described, it should be appreciated that a third-party ad server 210 may include similar hardware or software components and/or additional or alternate hardware or software components as those described through reference to other components of the architecture 200

It should be appreciated that the program modules, applications, computer-executable code, or the like depicted in FIG. 2 as being stored in the data storage 222, the data storage 244, or the data storage 266 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the ad network server 202, the website publisher server 204, the third-party ad server 210, the user device 206, and/or hosted on other computing device(s) accessible via one or more of the network(s) 212 may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices of the system architecture 200 in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the ad network server 202, the website publisher server 204, the user device 206, the third-party ad server 210, or any other illustrative component of the system architecture 200 may include alternate and/or additional hardware, software, or firmware components beyond those described or depicted without departing from the scope of the disclosure. More particularly, it should be appreciated that software, firmware, or hardware components depicted as forming part of any entity included in the architecture 200 are merely illustrative and that some components may not be present or additional components may be provided in various embodiments. While various illustrative program modules have been depicted as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Data Flows and Illustrative Processes

Figure 4:
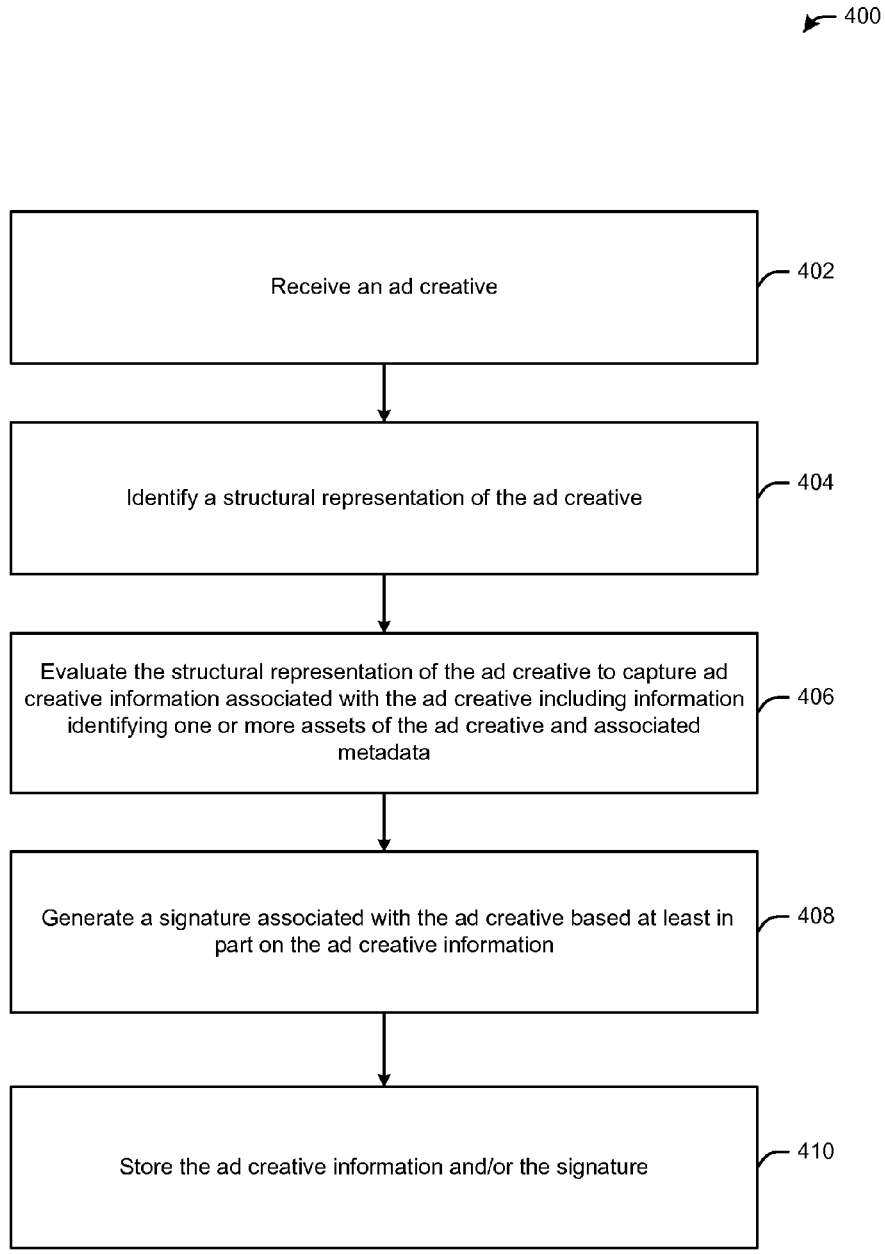
FIG. 4 is a process flow diagram of an illustrative method for capturing ad creative information associated with an ad creative and generating a corresponding signature based at least in part on the ad creative information in accordance with one or more example embodiments of the disclosure.
Figure 5:
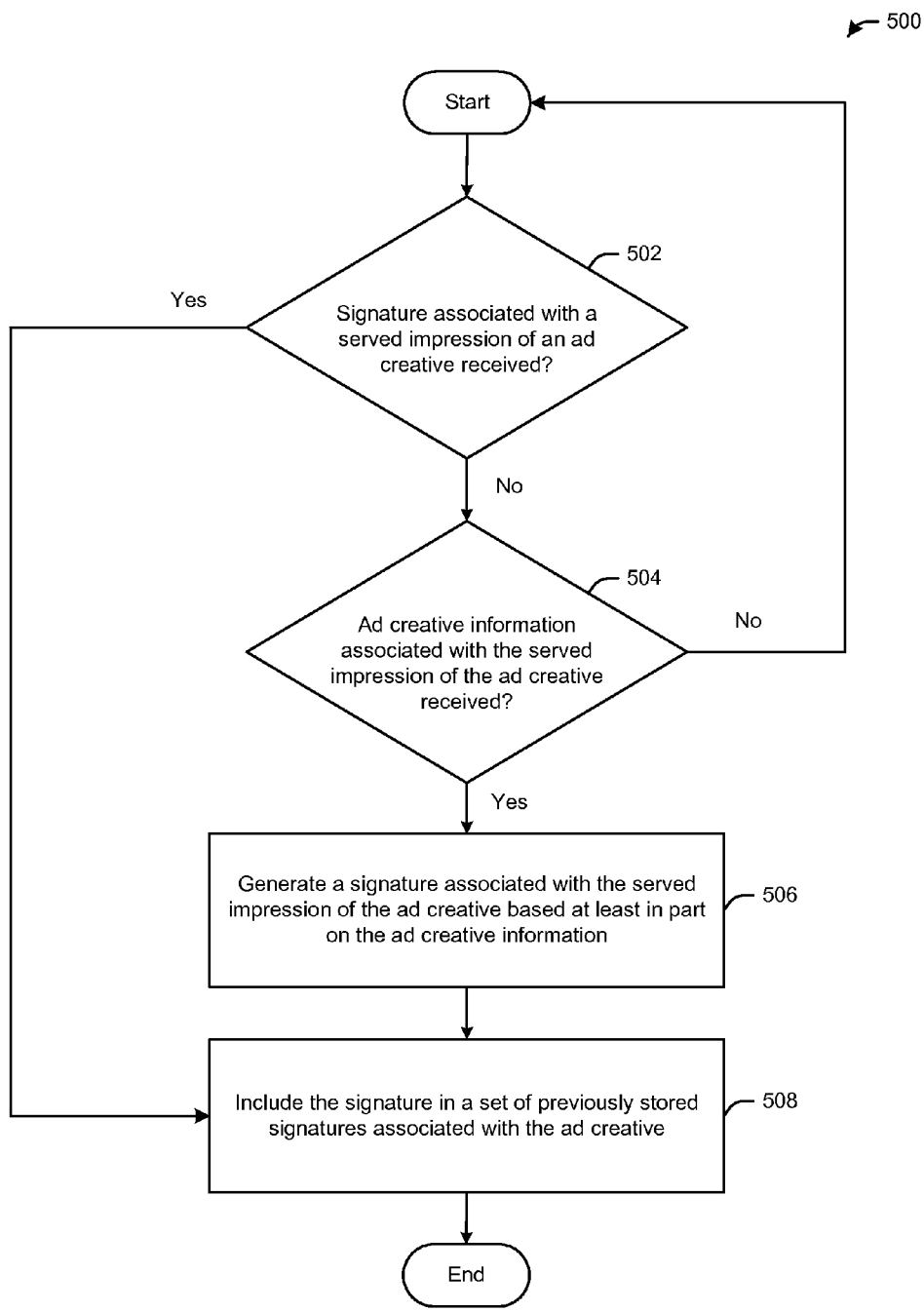
FIG. 5 is a process flow diagram of an illustrative method for receiving or generating a signature associated with a served impression of an ad creative and storing the signature among a set of previously stored signatures for the ad creative in accordance with one or more example embodiments of the disclosure.

FIG. 4 is a process flow diagram of an illustrative method 400 for capturing ad creative information associated with an ad creative and generating a corresponding signature based at least in part on the ad creative information in accordance with one or more example embodiments of the disclosure. FIG. 5 is a process flow diagram of an illustrative method 500 for receiving or generating a signature associated with a served impression of an ad creative and storing the signature among a set of previously stored signatures for the ad creative in accordance with one or more example embodiments of the disclosure.

One or more operations of the method 400 or the method 500 may be described as being performed by an ad network server 202, or more specifically, by one or more program modules, applications, or the like executing on the ad network server 202. It should be appreciated, however, that any of the operations of the method 400 or the method 500 may be performed by another device or component of the system architecture 200. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of the method 400 or the method 500 may be described in the context of the illustrative system architecture 200, it should be appreciated that the method 400 or the method 500 may be implemented in connection with numerous other architectural and device level configurations.

In certain example embodiments, the illustrative method 400 may be performed in connection with pre-registration of an ad creative. At block 402, the ad network server 202 may receive an ad creative from, for example, a third-party ad server 210. Alternatively, the ad network server 202 may receive one or more references to one or more ad assets forming part of the ad creative.

At block 404, computer-executable instructions provided as part of the ad creative evaluation module(s) 228 may be executed to identify (or generate) a structural representation of the ad creative. The structural representation may be, for example, a DOM tree that includes one or more nodes corresponding to one or more assets of the ad creative and associated metadata.

At block 406, computer-executable instructions provided as part of the ad creative evaluation module(s) 228 may be executed to evaluate the structural representation of the ad creative (e.g., traverse the DOM tree) to capture ad creative information. The ad creative information may include information identifying one or more assets of the ad creative and associated metadata such as, for example, an identification of domain(s) storing the ad creative asset(s), size, content, placement, or other attributes of the ad creative asset(s), and so forth.

At block 408, computer-executable instructions provided as part of the ad creative signature generation module(s) 230 may be executed to generate a signature associated with the ad creative based at least in part on the ad creative information captured at block 406. The signature may be a hash value uniquely associated with a particular state of the ad creative as embodied by the ad creative information captured at block 406.

At block 410, computer-executable instructions provided as part of the ad creative evaluation module(s) 228 may be executed to store the ad creative information captured at block 406 and/or the signature generated at block 408.

In certain example embodiments, the illustrative method 500 may be performed in lieu or in addition to the pre-registration process of method 400. The method 500 may be performed iteratively as ad creative information and/or signatures associated with served ad impressions are received, and may result in the accumulation of a set of signatures associated with an ad creative. Each signature may be reflective of attributes of a corresponding served impression of the ad creative.

At block 502, computer-executable instructions provided as part of the ad creative evaluation module(s) 228 may be executed to determine whether a signature associated with a served impression of an ad creative has been received. In response to a positive determination at block 502, the method 500 may proceed to block 508 where the received signature may be stored. More specifically, the signature may be included in a set of previously stored signatures associated with the ad creative.

On the other hand, in response to a negative determination at block 502, the method 500 may proceed to block 504, where computer-executable instructions provided as part of the ad creative evaluation module(s) 228 may be executed to determine whether ad creative information associated with the served impression of the ad creative has been received. In response to a negative determination at block 504, the method 500 may return to block 502.

On the other hand, in response to a positive determination at block 504, the method 500 may proceed to block 506, where computer-executable instructions provided as part of the ad creative signature generation module(s) 230 may be executed to generate a signature associated with the served impression of the ad creative based at least in part on the ad creative information. The method 500 may then proceed to block 508, where the generated signature may be stored. More specifically, the signature may be included in a set of previously stored signatures associated with the ad creative.

It should be appreciated that numerous variations of the illustrative method 500 are also within the scope of this disclosure. For example, while receipt of ad creative information and a signature associated with the rendered impression of the ad creative are depicted in the alternative in FIG. 5, in certain example embodiments, a hybrid scenario may occur. That is, in certain example embodiments, the ad network server 202 may receive at least a portion of the ad creative information in association with a signature of the rendered impression of the ad creative. In such example embodiments, the at least a portion of the ad creative information may be stored in association with the received signature. Further, in such embodiments, the at least a portion of the ad creative information that is received may or may not have been used to generate the signature.

Figure 3:
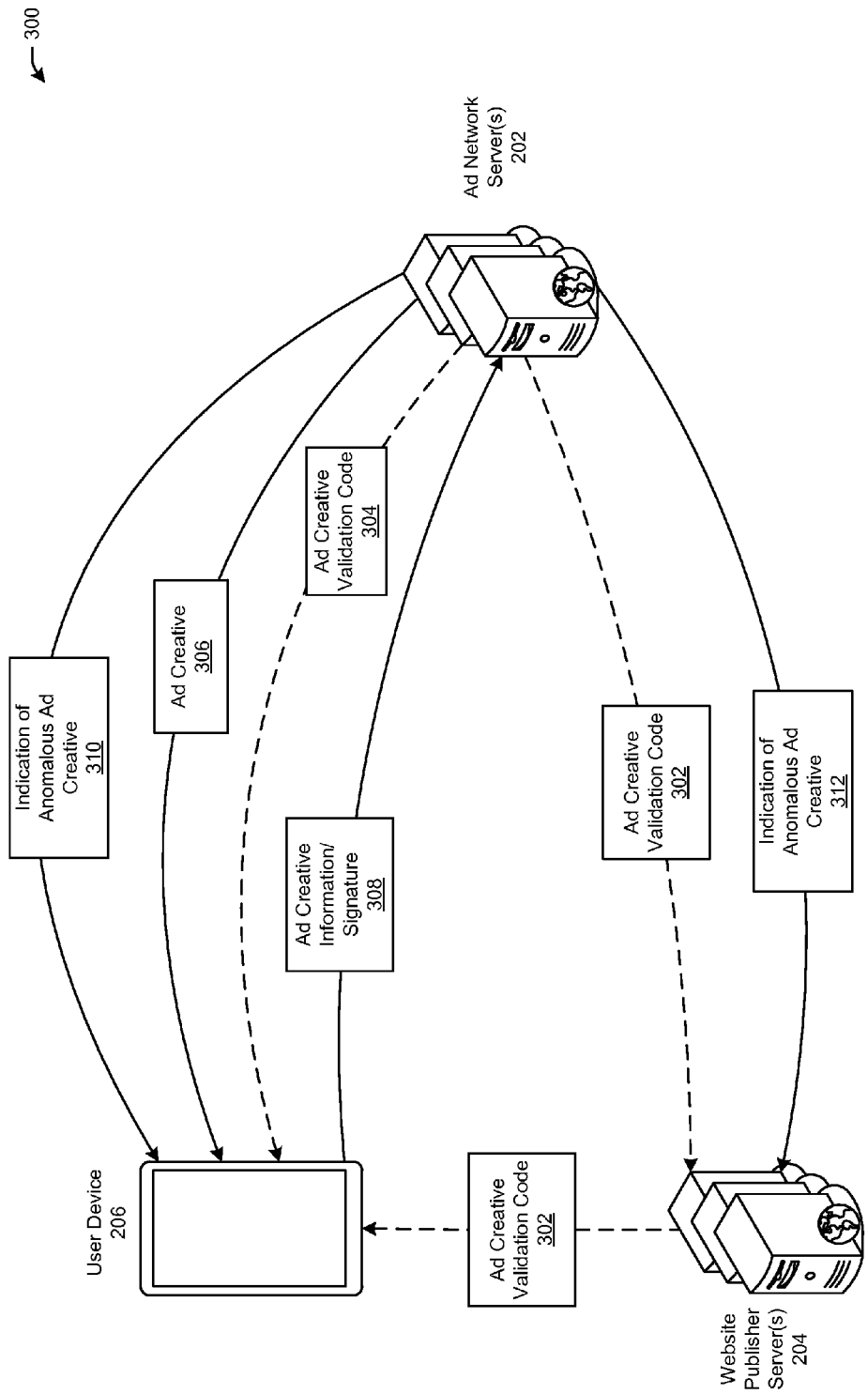
FIG. 3 is a hybrid system and data flow diagram depicting illustrative data communications in connection with the detection of anomalous advertisements in accordance with one or more example embodiments of the disclosure.
Figure 6:
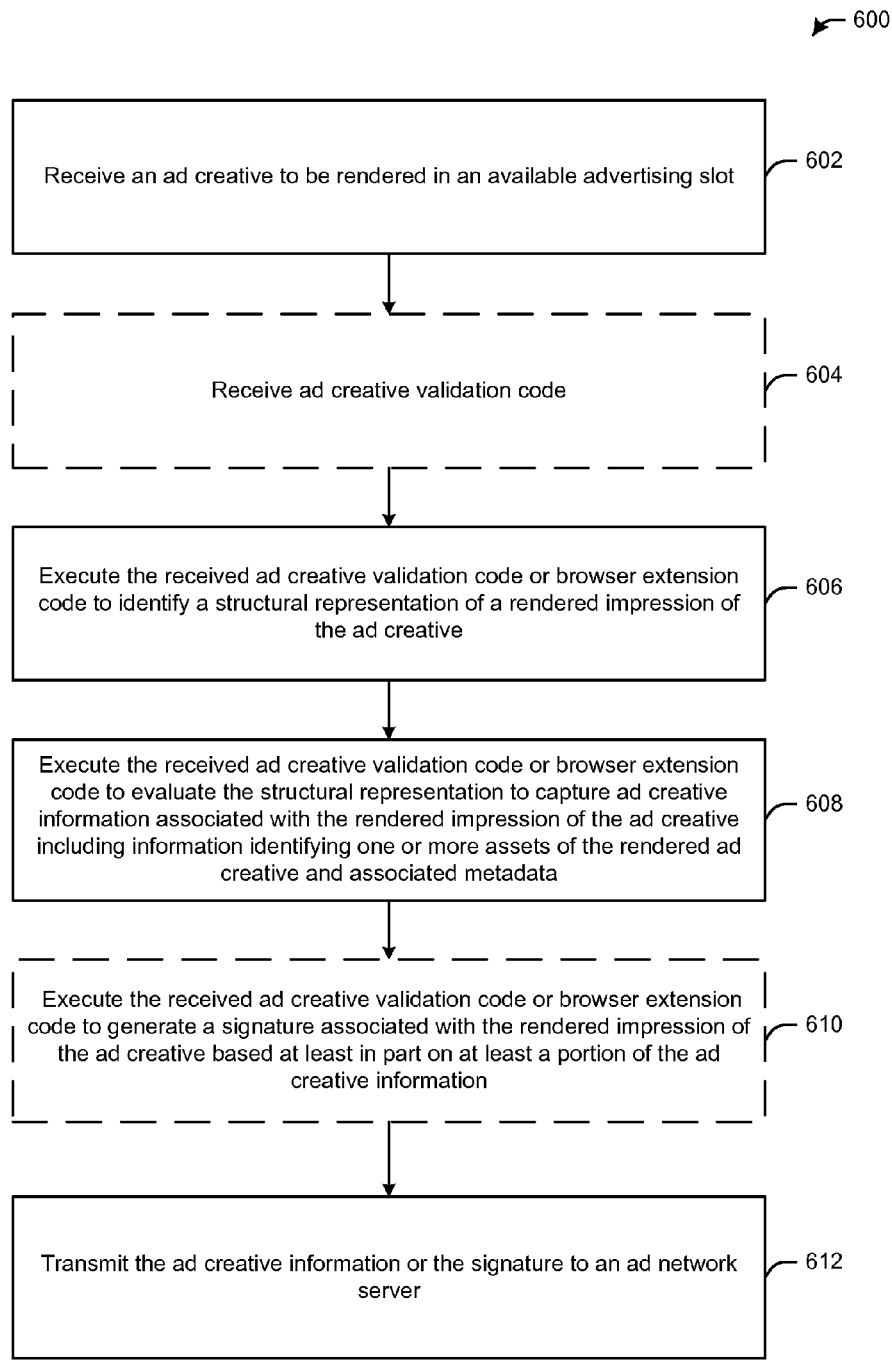
FIG. 6 is a process flow diagram of an illustrative method for executing client-side executable code to capture ad creative information associated with a rendered advertisement and generate a corresponding signature associated the advertisement in accordance with one or more example embodiments of the disclosure.
Figure 7:
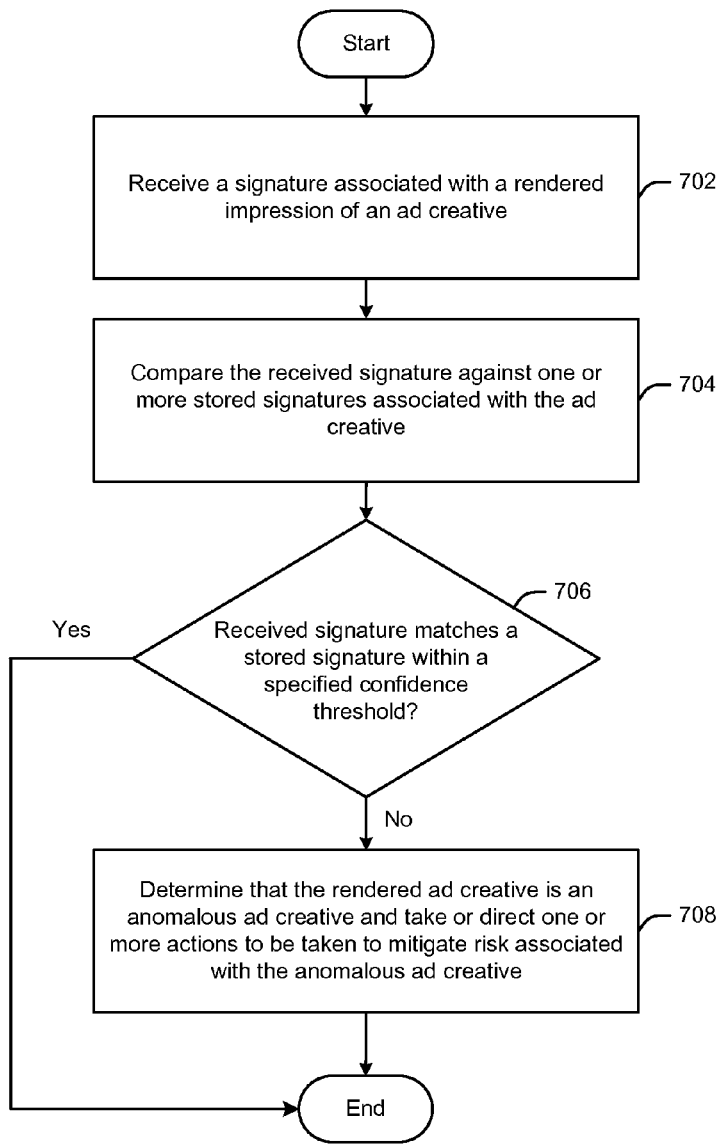
FIG. 7 is a process flow diagram of an illustrative method for detecting an anomalous advertisement and taking or directing one or more actions to be taken in response thereto in accordance with one or more example embodiments of the disclosure.

FIG. 3 is a hybrid system and data flow diagram depicting illustrative data communications in connection with the detection of anomalous advertisements in accordance with one or more example embodiments of the disclosure. FIG. 3 will be described hereinafter in conjunction with FIGS. 6 and 7. FIG. 6 is a process flow diagram of an illustrative method 600 for executing client-side executable code to capture ad creative information associated with a rendered advertisement and generate a corresponding signature associated the advertisement in accordance with one or more example embodiments of the disclosure. FIG. 7 is a process flow diagram of an illustrative method 700 for detecting an anomalous advertisement and taking or directing one or more actions to be taken in response thereto in accordance with one or more example embodiments of the disclosure.

One or more operations of the method 600 may be described as being performed by a user device 206, or more specifically, by one or more program modules, applications, or the like executing on the user device 206. Similarly, one or more operations of the method 700 may be described as being performed by an ad network server 202, or more specifically, by one or more program modules, applications, or the like executing on the ad network server 202. It should be appreciated, however, that any of the operations of the method 600 or the method 700 may be performed by another device or component of the system architecture 200. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of the method 600 or the method 700 may be described in the context of the illustrative system architecture 200, it should be appreciated that the method 600 or the method 700 may be implemented in connection with numerous other architectural and device level configurations.

Referring to FIGS. 3 and 6 in conjunction with each other, at block 602, a user device 206 may receive an ad creative 306 to be rendered in an available advertising slot on, for example, a web page hosted by a website publisher server 204. Receipt of the ad creative 306 may include receipt of one or more ad creative assets forming part of the ad creative 306 (and potentially associated metadata). The ad creative 306 may be received, for example, from an ad network server 102 and/or from one or more third-party ad servers 210.

At block 604, the user device 206 may receive computer-executable ad creative validation code. In certain example embodiments, the user device 206 may receive ad creative validation code 304 from the ad network server 202. The ad creative validation code 304 may be received in a same wrapper or container (e.g., an iframe) in which the ad creative 306 is encapsulated. In other example embodiments, the ad creative validation code 304 may include a sentinel validation program or the like that operates in conjunction with a browser extension 252 of a browser application 250 executing on the user device 206. In still other example embodiments, the ad network server 202 may transmit computer-executable ad creative validation code 302 to the website publisher server 204 which may, in turn, integrate the executable ad creative validation code 302 with web page content 274 and transmit the web page content 274 with the integrated executable ad creative validation code 302 to the user device 206. It should be appreciated that the computer-executable ad creative validation code 302 may, in certain example embodiments, correspond to the ad creative validation code 272 and the computer-executable ad creative validation code 304 may correspond to the ad creative validation code 254.

In certain example embodiments, the ad creative validation code 302 or 304 may not be received by the user device 206 from the ad network server 202. Rather, in certain example embodiments, a browser extension 252 of a browser application 250 may instead support functionality for capturing ad creative information associated with a rendered impression of an ad creative and potentially generating an associated signature. In still other example embodiments, such functionality may form part of native functionality supported by a browser application 250. In those example embodiments in which a browser extension 252 or native browser functionality is provided to capture ad creative information, the browser extension 252 or the native browser functionality may be updated as appropriate. Updates may be pushed to the user device 206, or alternatively, the browser extension 252 or the browser application 250 may periodically poll for updates. In certain example embodiments, an ad creative itself may include embedded code that notifies the browser extension 252 or browser application 250 that an update is available.

At block 606, the user device 206 may execute the received computer-executable ad creative validation code or browser extension code to identify (or generate) a structural representation (e.g., a DOM tree) associated with a rendered impression of the ad creative.

At block 608, the user device 206 may execute the received computer-executable ad creative validation code or browser extension code to evaluate the structural representation (e.g., traverse the DOM tree) to capture ad creative information associated with the rendered impression of the ad creative. The ad creative information may include information identifying one or more assets of the rendered ad creative and associated metadata.

At block 610, the user device 206 may execute the received computer-executable ad creative validation code or browser extension code to evaluate the structural representation (e.g., traverse the DOM tree) to generate, based at least in part on at least a portion of the ad creative information, a signature associated with the rendered impression of the ad creative.

At block 612, the user device 206 may transmit a message 308 including the ad creative information and/or any signature that may have been generated at block 610 to the ad network server 202.

Referring now to FIGS. 3 and 7 in conjunction with each other, the ad network server 202 may receive a signature 308 associated with a rendered impression of an ad creative on a user device 206. While the example operations of method 700 may assume that a signature is received, it should be appreciated that ad creative information representative of an entire or partial payload associated with the rendered impression may instead be received, in which case, the ad network server 202 may perform processing (as described herein) to generate a signature associated with the rendered impression based at least in part on at least a portion of the ad creative information. Still further, in certain example embodiments, a partial payload may be received along with a signature.

At block 704, computer-executable instructions provided as part of the ad creative anomaly detection module(s) 232 may be executed to compare the received signature against one or more stored signatures associated with the ad creative.

At block 706, computer-executable instructions provided as part of the ad creative anomaly detection module(s) 232 may be executed to determine whether the received signature matches a stored signature within a specified confidence threshold. In certain example embodiments, absolute equivalence of the received signature and a stored signature may be required to determine that a match exists. In other example embodiments, a match may be determined to exist even if the received signature deviates from a stored signature as long as the deviation is within a threshold amount. For example, a set of stored signatures for an ad creative may indicate various targeting criteria, constraints, attributes, or the like in accordance with which impressions of the ad creative have been rendered. A received signature may indicate a particular set of targeting criteria, constraints, attributes, or the like for a particular impression of the ad creative, The received signature may be permitted to deviate from the stored signatures—which may be indicative of a deviation in targeting criteria, constraints, attributes, or the like—as long as that deviation does not exceed a threshold.

Responsive to a positive determination at block 706, the method 700 may end. On the other hand, responsive to a negative determination at block 706, the method 700 may proceed to block 708 where the ad network server 202 may determine that the rendered ad creative is an anomalous ad creative and may take or direct one or more actions to be taken to mitigate risk associated with the anomalous ad creative. Such actions may include transmitting a message 310 to the user device 206 which may, in turn, cause the ad creative to be removed from a web page loaded on the user device 206, cause the ad creative to be quarantined, and so forth. Additionally, or alternatively, the ad network server 202 may transmit a message 312 to the website publisher server 204 which may, in turn, prevent the ad creative from being served in available advertising inventory on web pages hosted by the website publisher server 204. Additionally, or alternatively, any amount of telemetry may be collected regarding to the ad creative using any of the investigative techniques previously described (e.g., increasing breadth and frequency of scanning for the ad creative).

It should be appreciated that embodiments of the disclosure may be applicable to any number of other scenarios that may not involve malvertising. For example, ad creative validation code, a browser extension, native browser functionality or the like may be configured to scan web page content to determine whether the content may be undesirable to an advertiser. If the content is determined to be undesirable, the ad network server 202 may refrain from transmitting an ad creative associated with the advertiser to a website publisher server 204 hosting the web content and/or a browser application, browser extension, ad creative validation code, or the like executable on a user device 206 may prevent the ad from loading on the device. In other example scenarios, embodiments of the disclosure may be used to detect when a third party (e.g., a website publisher computer 204) substitutes a different ad creative for an ad creative that is intended to be rendered on a website. It should be appreciated that the example "non-malicious" or "semi-malicious" scenarios described above are merely illustrative and not exhaustive.

The operations described and depicted in the illustrative methods of FIGS. 4-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4-7 may be performed. In addition, the data communications depicted in FIG. 3 are merely illustrative, and in certain example embodiments, more or less data communications than those depicted may occur. Moreover, the depicted data communications or additional data communications not depicted may occur between different pairs of communicating entities or may involve additional intermediary devices not depicted.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That is which is claimed is:

1. A method, comprising:
   receiving, by an ad network system comprising one or more ad network servers comprising one or more computer processors, identification information associated with an ad creative;
   identifying, by the ad network system, a structural representation of the ad creative;
   evaluating, by the ad network system, the structural representation of the ad creative to capture ad creative information of an initial state of the ad creative, wherein the ad creative information comprises information indicative of one or more assets forming part of the ad creative and metadata associated with the one or more assets;
   generating, by the ad network system, a first signature of the initial state of the ad creative based at least in part on at least a portion of the ad creative information;
   storing, by the ad network system, the first signature;
   receiving, by the ad network system from a user device, a second signature determined at a time of loading of the ad creative on the user device;
   comparing the first signature with the second signature;
   determining, by the ad network system and based at least in part on the comparing, that the second signature does not match the first signature, wherein determining that the second signature does not match the first signature comprises determining that the difference between the second signature and first signature exceeds a first threshold;
   determining, by the ad network system, that the ad creative is associated with an anomalous state based at least in part on determining that the second signature does not match the first signature; and
   performing or directing, by the ad network system, one or more actions to be performed responsive to determining that the ad creative is associated with an anomalous state.

2. The method of claim 1, wherein generating the first signature comprises applying a cryptographic hash function to the at least a portion of the ad creative information to generate a first hash value, and wherein the first signature comprises the first hash value and the second signature comprises a second hash value.

3. The method of claim 2, wherein determining that the second signature does not match the first signature comprises determining that the second hash value is not equivalent to the first hash value.

4. The method of claim 2, wherein determining that the second signature does not match the first signature comprises determining that a deviation between the second hash value and the first hash value meets or exceeds a threshold deviation amount.

5. The method of claim 1, wherein the one or more actions comprise transmitting a respective message indicating that the ad creative is associated with an anomalous state to each of at least one of the user device or a web server hosting a web page on which the ad creative is loaded.

6. A system, comprising:
  at least one memory storing computer-executable instructions; and
  at least one processor configured to access the at least one memory and execute the computer-executable instructions to:
    identify a first signature of a first state of an ad creative;
    store the first signature;
    receive, from a user device, a second signature determined at a loading of the ad creative on the user device;
    compare the first signature with the second signature;
    determine based at least in part on the comparison that the second signature matches the first signature, wherein determining that the second signature matches the first signature comprises determining that the difference between the second signature and first signature is less than a first threshold; and
    determine that the ad creative is associated with an anomalous state that is different from the first state based at least in part on the determination that the second signature matches the first signature.

7. The system of claim of 6, wherein the at least one processor is configured to identify the first signature of the first state of the ad creative by executing the computer-executable instructions to:
  receive identifying information associated with the ad creative;
  identify a structural representation of the ad creative;
  evaluate the structural representation of the ad creative to capture ad creative information associated with the first state of the ad creative, wherein the ad creative information comprises information indicative of one or more assets forming part of the ad creative and metadata associated with the one or more assets; and
  generate the first signature of the first state of the ad creative based at least in part on at least a portion of the ad creative information.

8. The system of claim 7, wherein the structural representation of the ad creative comprises a document object model (DOM) tree associated with the first state of the ad creative, and wherein the at least one processor is configured to execute the computer-executable instructions to evaluate the DOM tree by traversing one or more nodes of the DOM tree.

9. The system of claim of 7, wherein the at least one processor is configured to generate the first signature by executing the computer-executable instructions to:
  provide the at least a portion of the ad creative information as input to a cryptographic hash function; and
  execute the cryptographic hash function to generate output comprising a hash value uniquely associated with the first state of the ad creative,
  wherein the first signature comprises the hash value.

10. The system of claim 9, wherein the ad creative information is first ad creative information, wherein the hash value is a first hash value, and wherein the at least one processor is further configured to identify the second signature by executing the computer-executable instructions to:
  receive second ad creative information associated with the second state of the ad creative;
  provide at least a portion of the second ad creative information as input to the cryptographic hash function; and
  execute the cryptographic hash function to generate output comprising a second hash value uniquely associated with the second state of the ad creative,
  wherein the second signature comprises the second hash value.

11. The system of claim 10, wherein the at least one processor is configured to determine that the second signature matches the first signature based at least in part on the second hash value being equivalent to the first hash value.

12. The system of claim 6, wherein the at least one processor is configured to determine that the second signature does not match the first signature based at least in part on a deviation between the second signature and the first signature meeting or exceeding a threshold deviation amount.

13. The system of claim of 6, wherein it is determined that the second signature does not match the first signature, wherein it is further determined that the ad creative is associated with the anomalous state based at least in part on the determination that the second signature does not match the first signature, and wherein the at least one processor is further configured to execute the computer-executable instructions to:
  perform or direct one or more actions to be performed to mitigate a risk associated with the anomalous state of the ad creative,
  wherein the one or more actions comprise transmitting a respective message indicating that the ad creative is associated with the anomalous state to each of at least one of the user device or a web server hosting a web page on which the ad creative is loaded.

14. The system of claim of 6, wherein it is determined that the second signature does not match the first signature, wherein it is further determined that the ad creative is associated with the anomalous state based at least in part on the determination that the second signature does not match the first signature, and wherein the at least one processor is further configured to execute the computer-executable instructions to:
  perform or direct one or more actions to be performed to determine that the anomalous state is associated with malware,
  wherein the one or more actions comprise scanning for the ad creative with a greater scanning frequency or using a greater number of scanners.

15. The system of claim 6, wherein the at least one processor is further configured to execute the computer-executable instructions to:
  receive a respective signature associated with each of a plurality of served impressions of the ad creative, wherein each impression is associated with a respective set of targeting criteria;
  include each respective signature in an existing set of signatures associated with the ad creative, wherein the existing set of signatures comprises the first signature and the second signature.

16. The system of claim 6, wherein the at least one processor is further configured to execute the computer-executable instructions to:
- generate computer-executable validation code;
- encapsulate the computer-executable validation code and at least a portion of the ad creative information in a container; and
- transmit the encapsulated computer-executable validation code and the at least a portion of the ad creative information to the user device.

17. The system of claim 6, wherein the at least one processor is further configured to execute the computer-executable instructions to:
- generate a plurality of candidate signature generating functions;
- select a particular signature generating function of the plurality of signature generating functions; and
- generate the first signature responsive to execution of the particular signature generating function.

18. The system of claim 6, wherein the at least one processor is further configured to execute the computer-executable instructions to:
- generate the first signature responsive to execution of a signature generating function;
- update the signature generating function to generate an updated signature generating function; and
- generate an updated first signature responsive to execution of the updated signature generating function.

19. One or more non-transitory computer-readable media storing computer-executable instructions that, responsive to execution by one or more computer processors, cause operations to be performed comprising:
- determining that an ad creative is being rendered;
- identifying a structural representation for the ad creative responsive to determining that the ad creative is being rendered;
- evaluating the structural representation to capture ad creative information for a state of the ad creative being rendered, wherein the ad creative information comprises information indicative of one or more assets forming part of the ad creative and metadata associated with the one or more assets;
- transmitting the ad creative information or a signature generated based at least in part on at least a portion of the ad creative information to a remote system, wherein the signature is compared with a stored signature to determine a state of the ad creative;
- receiving a message from the remote system, wherein the message indicates that the state of the ad creative is an anomalous state based, at least in part, the difference between the second signature and first signature exceeding a first threshold.

20. The one or more computer-readable media of claim 19, the operations further comprising:
- performing one or more actions responsive to identifying the message received from the remote system,
- wherein the one or more actions comprise at least one of: i) removing the ad creative from a web page on which the ad creative is being rendered or ii) quarantining the ad creative.

21. The one or more computer-readable media of claim 19, wherein the computer-executable instructions comprise computer-executable validation code, and wherein the computer-executable validation code is embedded in a same container that includes the ad creative.

22. The one or more computer-readable media of claim 19, wherein the computer-executable instructions are included in a browser extension associated with browser application.

* * * * *